Patented Aug. 20, 1940

2,212,108

UNITED STATES PATENT OFFICE 2,212,108

PROCESS OF TREATING ROTARY MUD

Vernon B. Zacher, Ventura, Calif., assignor to Tidewater Associated Oil Company, New York, N. Y., a corporation of Delaware No Drawing. Application April 23, 1938, Serial No. 203,828

9 Claims. (Cl. 255—1)

This invention relates to deep well drilling, and more particularly to an improved circulation fluid used in rotary drilling.

The use of circulation fluid, or "drilling mud" as it is known in the field, is now well established.

Its paramount function is to support the wall of the bore from collapsing, by means of hydrostatic pressure. This, therefore, has a definite relation to the tendency of the drilling mud to dewater, the latter referring to the loss of water through the wall of the bore.

Other functions performed by drilling mud in connection with rotary drilling have been to prevent high pressure water or gas from entering the hole, or the opposite effect of water from the drilling fluid entering the formation; and further to prevent accumulation of detritus by carrying away the cuttings which the bit has loosened from the formation which it is penetrating, and to lubricate between the drill stem and walls of the hole.

As the art of drilling developed, however, more difficult and highly technical drilling problems were encountered in sealing the wall of the bore. For example, in penetrating various types of shales and sandy formations, there is a tendency for the walls of the bore to cave in, not only filling the hole therebelow with material which must be removed, but often causing the drill itself to become stuck so securely that it cannot be removed.

Also, as it became necessary or desirable to drill deeper and deeper wells, the problem of settling of the cuttings within the circulation fluid presented itself, and required the use of a fluid of sufficient body to hold the cuttings in suspension during the relatively long period required to lift the cuttings from the bottom of the hole to the surface.

The problem was not solved merely by reducing the proportionate water content of the mud so as to make it less "fluid" for it was found that by so doing, the viscosity of the mixture was so increased as to interfere with its flow through the relatively restricted delivery orifices in the drill bit, and through the channels between the flukes of the bit as it starts its upward course carrying the cuttings.

In the endeavor to provide a circulation fluid of optimum characteristics to meet the problems, a few of which have been outlined hereinabove, the industry has resorted to the expedient of adding various types of materials to the circulation fluid, among them being chemicals, both organic and inorganic, (e. g. sodium silicate, $Na_2SiO_3$; sodium carbonate or soda ash, $Na_2CO_3$; sodium hydroxide, $NaOH$; and the like) and minerals, such as silica, several types of diatomaceous earth, clays, bentonite, barite, hematite, etc. During the course of this experimentation, it was usually found that whereas the addition of a certain material to the circulation fluid improved its characteristics in certain respects, such as causing it to hold detritus in suspension longer, it impaired its efficiency in other respects, such as decreasing its heat absorption and dissemination capability. Or, certain materials made the mud so thick and viscous that it would not flow properly, or so sticky that whereas it was very effective in sealing off porous walls of the hole, it adhered too tenaciously to the drilling apparatus and was otherwise difficult to handle.

With the outlined field conditions and others encountered in the course of rotary drilling operation in mind, it is an object of the present invention to provide a circulation fluid possessed of the optimum characteristics with regard to fluidity, ability to hold solid particles in suspension, tendency to adhere to the walls, or "gel" so as to seal off porous walls and reinforce the walls which otherwise tend to cave in, rapidity with which it both absorbs and disseminates heat, and the other requirements of an efficient circulation fluid.

Another object of my invention is to make it possible and practicable to improve circulation fluid already in use by the addition of material thereto capable of adding these desirable characteristics thereto or enhancing such desirable characteristics which they may already possess without impairment of other desirable characteristics of the fluids.

Another object is to provide a method and fluid solution suitable for addition to a more or less concentrated water-mud solution, not for circulation therewith, but for "spotting" opposite the open hole immediately before withdrawing the drill stem prior to running casing, liner or other tools.

A further object is to accomplish the above and other desirable objects through the medium of a material which is readily available in suitably large supplies, which is sufficiently inexpensive to make its widespread commercial use feasible, and which is of such nature that it lends itself readily to handling during shipment and during manipulation to incorporate it into the circulation fluid.

Still another object of my invention is to make available a circulation fluid improving material of the class indicated which is highly retentive of water, the purpose being to prevent absorption into the formation.

The invention possesses other objects and advantageous features which will occur to those skilled in the art and it is my intention not to limit it specifically except as expressed in the appended claims; nor is it my intention to be bound by the explanations of theory expressed herein should subsequent investigation show them to require alteration.

Proceeding now with a more detailed description, my present invention contemplates alternative methods for the treating of drilling fluid with the organic material known commercially as "lignin." This reagent is closely allied to cellulose, being chemically related thereto, and the two occur in different proportions in practically all woody tissue. Hence, it is available in practically unlimited supply, and can be isolated, and produced in sufficient degrees of purity to meet commercial demands, at a cost well within the limit established by the uses and quantities which the present invention contemplates.

Lignin enters into a highly colloidal solution with the water.

When it is to be added to the drilling mud for circulation therewith, it is preferably first mixed with water and then is gradually added to the mud, wherein it properly distributes itself.

When the lignin is not to be circulated but "spotted," a mixture of lignin and water is introduced into the drilling mud and circulation is stopped when calculations show that the lignin has reached the desired point.

Lignin, introduced in either manner, prevents the formation of a filter cake of objectionable thickness, thus allowing easy entrance and withdrawal of whatever tool is being inserted. Higher concentration of lignin may be used in "spotting" than in circulating.

When it is desired to condition the hole by distributing the lignin throughout the mud stream, the concentration should be quite low, approximately one hundred pounds to one hundred barrels of mud, so as not to provoke "fluffiness." This is considerably below the amount of lignin required for optimum sealing action, and when the latter is needed, the better practice is to apply it by "spotting."

The dewatering effect prevented by the use of lignin is very likely due to the rapidity with which a lignin treated mud builds up a thin coating on the wall of the bore. From observations made up to the present time, the wall appears to be coated with a very thin impervious dam. The lignin is by nature very sticky and the coating seems to reach a certain thickness and remain about the same with the balance of the lignin remaining in solution and circulating with the mud. In other words, the wall quickly builds up to a certain point where filtering stops and the wall gets no thicker, the balance of the lignin circulating in the solution. The advantage gained by this quality of lignin is that it reduces almost to a point of complete cessation, the tendency for the mud to lose its water.

As an example of the advantage gained in this connection, in a recent test, a well being drilled and using circulation fluid treated with seventy-one sacks of what is at present ordinarily held to be the best known conditioning material, required the addition of no less than fifteen barrels of water per hour in order to keep the mud at its initial state of fluidity. After the test had been long enough to determine accurately this rate of water loss, eight sacks of lignin were added, and within half an hour the water loss was reduced to a negligible amount. In this case, even though the water loss practically ceased, the efficiency of the circulation fluid in performing its other functions was not in the least impaired.

A filtration test to check upon the comparative rates of water loss of untreated and treated mud was made with samples placed in filters. It was found that in ten minutes the mud without lignin lost fourteen per cent. of its water, and that treated with lignin lost only four per cent. After remaining on the filters for a full hour, the former lost over thirty-one per cent., and the latter less than half that amount. Of significance also was the thickness of the respective filter cakes built up by the two circulation fluids during this test. That built up by the untreated mud in an hour was one-half inch thick, whereas that resulting from the lignin treated mud was only 0.32 inch in thickness. Even though the mud treated with lignin built up a thinner wall between the body of the fluid and the formation which seeks to absorb moisture from the fluid, it was more effective in reducing the rate at which moisture passes through than in the case of the untreated mud with its thicker wall.

This at least partially accounts for the superiority of lignin-treated mud in reinforcing shale, sand and the like formations to prevent caving in and provides a method for accomplishing these beneficial effects. It shows the greater imperviousness of the wall treated with mud containing lignin, and indicates that it is more closely knit, and more tenacious as far as sticking together and adhering to the formation is concerned. Also, an important feature noted is that the relatively thin wall coating of lignin is easily removed by oil seeking entry to the hole.

In ordinary mud, I have found that about five and one-half sacks (133 lbs. per sack) of lignin per one hundred barrels of mud will give the best results and the minimum of water loss. Raising the lignin content above this ratio does not seem to do any good, as shown by the filter test. In some work as low as two sacks of lignin per one hundred barrels of mud were used with success so that the percentages are quite flexible. However, the optimum is in the neighborhood of five and one-half sacks of lignin per one hundred barrels of mud, and such proportions are best employed in the "spotting" method.

In the circulation method, the lignin, after mixing with water, may best be added gradually to the mud. A sack of lignin is usually mixed with a barrel of water. If the mud contains too much water, it is preferable to add fresh clay.

Where necessary to build up native mud to the proper colloidity, gel or other highly colloidal clay (e. g. bentonite) may be added. I find better results are obtained in using lignin with muds which do not have in them any of the other mixtures heretofore used to prevent dewatering as these sometimes prevent obtaining an intimate mix and cause the mud to thicken up too much.

Experience with various types of well-known mud treating materials heretofore used has taught that decreasing the concentration of solids in the fluid can be expected to cause a coincident decrease in the ability of the mixture to hold solid particles in suspension. This, of course, affects the efficiency of the fluid in carrying cuttings out of the hole, but principally in sustaining them in the event the pump is stopped. However, in the case of lignin, the loss of ability to hold particles in suspension, if any, was so small that it can be compensated for in any of several ways, such as by adding more solid matter to the mud. When changing these proportions, care should be exercised not to add such a quantity of the solid matter as will result in raising the viscosity of the mixture to a detrimental degree, or in lowering the lignin content to where the benefits of its presence are lost.

Thus it may be seen that by adding to that mixture of clay and water which is ordinarily employed as circulation fluid in a rotary drilling operation a suitable quantity of lignin, the efficiency of the circulation fluid in carrying out the purposes for which it is intended can be increased in a measure more than ample to compensate for the slight additional cost entailed in the use of the additional material.

For treating lost circulation, lignin, introduced to as high a concentration as readily pumpable at not too high pressure, has the advantage of lowering the mud weight and of forming a more impervious filter cake. For conditioning the mud before running casing, a moderate amount of lignin (e. g. two sacks per one hundred barrels of mud) will aid in preventing the mud from dewatering and thickening up during the pipe job. In holes that take considerable water, lignin is always used to advantage. Also, in holes with caving shale, lignin has been found of value since it gives to the mud the much desired characteristic and enables a wall to form which is more impervious to water and which very effectively seals off the shale. For this latter purpose it must be used moderately (two to five sacks per one hundred barrels) to prevent foaming and lowering the mud weight beyond the critical point.

I claim:

1. An earth bore coating mixture consisting of clay, water and lignin.

2. As a new article of commerce, a circulation fluid for use in rotary drilling of wells, consisting of a mixture of clay, water and purified lignin.

3. A rotary drilling circulation fluid comprising a mud composed of clay and water, and lignin added thereto in an uncombined state.

4. A rotary drilling circulation fluid consisting of a mud of clay and water, and lignin added thereto in substantially the proportion of between one and five and one-half sacks each holding 133 pounds to each hundred barrels of mud, each of said barrels containing approximately 380 to 550 pounds of mud.

5. As a conditioner for rotary drilling circulation fluid, lignin added thereto substantially in the proportions of from $\frac{1}{5}$ of 1% to 2% by weight of lignin to the untreated fluid.

6. In rotary drilling circulation fluid, mud consisting of a mixture of clay and water, lignin, substantially in proportion of from $\frac{1}{5}$ of 1% to 2% by weight of said mud without lignin and a solid added thereto to compensate in part for the drop in weight of said mixture resulting from the addition of said lignin.

7. The method of sealing off the walls of a bore which consists in mixing clay and water to form a mud fluid, adding lignin to said fluid, and circulating the resultant mixture along said bore walls.

8. The method of reducing water loss from a bore which consists in mixing a mud fluid, adding from $\frac{1}{5}$ of 1% to 2% by weight of said mud fluid of relatively pure lignin to said fluid, and circulating said mixture of mud and lignin in said bore.

9. The method of sealing a bore wall which consists in mixing a mud fluid, adding thereto uncombined lignin in proportion to the mud fluid by weight of from $\frac{1}{5}$ of 1% to 2%, and adding relatively inert heavy components in amount sufficient to raise the density of the entire mixture to a desired value.

VERNON B. ZACHER.